United States Patent
Gürtler et al.

(10) Patent No.: US 9,045,592 B2
(45) Date of Patent: Jun. 2, 2015

(54) PROCESS FOR THE PREPARATION OF POLYETHER CARBONATE POLYOLS

(75) Inventors: Christoph Gürtler, Köln (DE); Jörg Hofmann, Krefeld (DE); Aurel Wolf, Wülfrath (DE); Stefan Grasser, Leverkusen (DE)

(73) Assignee: Bayer Intellectual Property GmbH, Monheim (DE)

( * ) Notice: Subject to any disclaimer, the term of this patent is extended or adjusted under 35 U.S.C. 154(b) by 116 days.

(21) Appl. No.: 13/821,254

(22) PCT Filed: Sep. 6, 2011

(86) PCT No.: PCT/EP2011/065364
§ 371 (c)(1),
(2), (4) Date: Apr. 2, 2013

(87) PCT Pub. No.: WO2012/032028
PCT Pub. Date: Mar. 15, 2012

(65) Prior Publication Data
US 2013/0184432 A1    Jul. 18, 2013

(30) Foreign Application Priority Data
Sep. 9, 2010 (DE) .......................... 10 2010 040 517

(51) Int. Cl.
| | | |
|---|---|---|
| C08G 64/32 | (2006.01) | |
| C08G 64/34 | (2006.01) | |
| C08G 64/18 | (2006.01) | |
| C08G 65/26 | (2006.01) | |
| C08G 59/20 | (2006.01) | |

(52) U.S. Cl.
CPC .............. *C08G 64/34* (2013.01); *C08G 64/183* (2013.01); *C08G 65/2663* (2013.01); *C08G 65/2603* (2013.01)

(58) Field of Classification Search
CPC ...................................................... C08G 64/32
USPC ................. 528/408, 409, 415, 485, 495, 405
See application file for complete search history.

(56) References Cited

U.S. PATENT DOCUMENTS

| | | |
|---|---|---|
| 3,404,109 A | 10/1968 | Milgrom |
| 5,158,922 A | 10/1992 | Hinney et al. |
| 6,323,375 B1 | 11/2001 | Hofmann et al. |
| 6,762,278 B2 | 7/2004 | Hinz et al. |
| 6,780,813 B1 | 8/2004 | Hofmann et al. |
| 6,852,663 B2 | 2/2005 | Ooms et al. |
| 2003/0149232 A1 | 8/2003 | Hinz et al. |
| 2003/0204042 A1 | 10/2003 | Moethrath et al. |
| 2005/0027145 A1 | 2/2005 | Hofmann et al. |
| 2005/0143606 A1 | 6/2005 | Combs |
| 2008/0021154 A1 | 1/2008 | Haider et al. |

FOREIGN PATENT DOCUMENTS

| | | |
|---|---|---|
| EP | 1359177 A1 | 11/2003 |
| EP | 1529566 A1 | 5/2005 |
| JP | 1992145123 | 5/1992 |
| WO | WO-99/19063 A1 | 4/1999 |
| WO | WO-01/04182 A1 | 1/2001 |
| WO | WO-01/39883 A1 | 6/2001 |
| WO | WO-01/80994 A1 | 11/2001 |
| WO | WO-2004044034 A1 | 5/2004 |
| WO | WO-2004081082 A1 | 9/2004 |
| WO | WO-2006/103214 A1 | 10/2006 |
| WO | WO-2008/013731 A1 | 1/2008 |

OTHER PUBLICATIONS

International Search Report for PCT/EP2011/065364 mailed Sep. 6, 2011.

*Primary Examiner* — Duc Truong
(74) *Attorney, Agent, or Firm* — Drinker Biddle & Reath LLP

(57) ABSTRACT

The present invention relates to a process for the preparation of polyether carbonate polyols from one or more alkylene oxides, carbon dioxide and optionally from one or more H-functional starter substances in the presence of at least one double metal cyanide catalyst, wherein the double metal cyanide catalyst comprises an unsaturated alcohol as a complexing ligand.

14 Claims, No Drawings

PROCESS FOR THE PREPARATION OF POLYETHER CARBONATE POLYOLS

RELATED APPLICATIONS

This application is a national stage application (under 35 U.S.C. §371) of PCT/EP2011/065364, filed Sep. 6, 2011, which claims benefit of German application 10 2010 040 517.5, filed Sep. 9, 2010.

The present invention relates to a process for the preparation of polyether carbonate polyols from one or more alkylene oxides, carbon dioxide and optionally from one or more H-functional starter substances in the presence of at least one double metal cyanide catalyst, wherein the double metal cyanide catalyst comprises an unsaturated alcohol (i.e. an alcohol comprising at least one C=C or one C≡C bond) as a complexing ligand.

The preparation of polyether carbonate polyols by catalytic reaction of alkylene oxides (epoxides) and carbon dioxide in the presence or absence of H-functional starter substances (starters) has been investigated intensively for more than 40 years (e.g. Inoue et al., Copolymerization of Carbon Dioxide and Epoxide with Organometallic Compounds; Die Makromolekulare Chemie 130, 210-220, 1969). This reaction e.g. using an H-functional starter substance is shown in diagram form in equation (I), wherein R represents an organic radical, such as alkyl, alkylaryl or aryl, each of which can also comprise hetero atoms, such as, for example, O, S, Si etc., and wherein e and f represent an integer, and wherein the product shown here for the polyether carbonate polyol in equation (I) is merely to be understood as meaning that blocks having the structure shown can in principle be found in the polyether carbonate polyol obtained, but the sequence, number and length of the blocks and the OH functionality of the starter can vary and is not limited to the polyether carbonate polyol shown in equation (I). This reaction (see equation (I)) is ecologically very advantageous, since this reaction represents the conversion of a greenhouse gas, such as $CO_2$, into a polymer. The cyclic carbonate (for example for R=$CH_3$ propylene carbonate) shown in formula (I) is formed as a further product, actually a by-product.

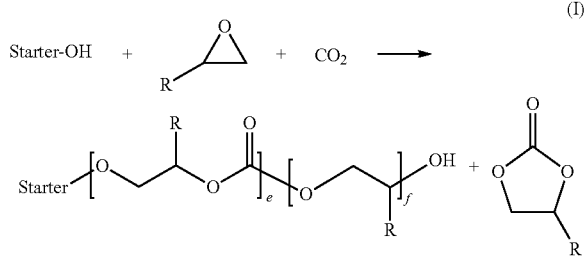

U.S. Pat. No. 3,404,109 describes the preparation of DMC catalysts for use in the polymerization of alkylene oxides and/or oxetanes in the presence of small amounts of water. It is stated there that alcohols, ethers, esters and other compounds are necessary as complexing ligands in the DMC catalyst in order to obtain active DMC catalysts for this reaction. An indication of the possibility of carrying out the reaction in the presence of carbon dioxide and therefore of incorporating carbon dioxide into the polymer is not to be found there.

In the following years the focus in DMC catalyst development was chiefly on ethers, such as "glyme" (dimethoxyethane) or "diglyme" (bis(2-methoxyethyl) ether) as complexing ligands (cf. e.g. in U.S. Pat. No. 5,158,922). A use of these catalysts in the copolymerization of alkylene oxides and carbon dioxide is not mentioned in U.S. Pat. No. 5,158,922.

JP-A 1992-145123 discloses that DMC catalysts prepared using tert-butyl alcohol (TBA; tert-butanol) show better properties, so that the focus of further works was shifted towards this complexing ligand, which thenceforth was the focal point of research. U.S. Pat. No. 6,852,663 e.g. thus describes a series of DMC catalysts which comprise at least two different complexing ligands, one of which, however, is always tert-butanol. These DMC catalysts are active in the reaction of alkylene oxides with H-functional starters. The copolymerization of alkylene oxides and carbon dioxide is not considered in U.S. Pat. No. 6,852,663.

WO-A 01/04182 describes catalysts which, in addition to the hexacyanometallate units typical of DMC catalysts, also comprise hexanitrometallate units. According to claim 1, these catalysts comprise the fragments $[M^1(CN)_6]^{n-}$ and $[M^2(NO_2)_6]^{m-}$ together, and in particular in the ratio of $[M^1(CN)_6]^{n-}/[M^2(NO_2)_6]^{m-}$ ranging from 50:50 to 99:1. Each catalyst must consequently also comprise at least a small amount of $[M^2(NO_2)_6]^{m-}$. By introduction of the new structural element $[M^2(NO_2)_6]^{m-}$, the catalysts are no longer necessarily comparable to the conventional DMC catalysts, since the DMC catalysts in the context of the present invention comprise no hexanitrometallate units $[M^2(NO_2)_6]^{3-}$ ($M^2$ is a trivalent transition metal ion, preferably $Fe^{3+}$, $Co^{3+}$, $Cr^{3+}$, $Mn^{3+}$, $Ir^{3+}$, $Rh^{3+}$).

US 2005/0143606 A1 describes a process for the preparation of polyols from alkylene oxides using DMC catalysts which comprise unsaturated, tertiary alcohols as complexing ligands. They have been tested for the polymerization of alkylene oxides in the presence of H-functional starter substances. Thus, for example, the use of DMC catalysts based on 2-methyl-3-buten-2-ol (MBE) has proved to be advantageous in the polymerization of alkylene oxides. tert-Butyl alcohol (TBA) can also be replaced by 2-methyl-3-butyn-2-ol (MBY). These ligands resulted in the following relative speed in the polymerization of alkylene oxides in the absence of carbon dioxide, in each case based on tert-butyl alcohol (TBA), which was set at 1.0:0.67 for 2-methyl-3-buten-2-ol (MBE)>0.61 for 2-methyl-3-butyn-2-ol (MBY)>0.40 for tert-amyl alcohol (TAA) as a saturated comparison ligand. However, the possibility of preparing copolymers from alkylene oxide and carbon dioxide is not described in US 2005/0143606 A1.

According to the current state of the art, the copolymerization of at least one alkylene oxide and carbon dioxide in the presence or absence of H-functional starter substances is preferably carried out in the presence of DMC catalysts which comprise tert-butanol as a ligand.

WO-A 2008/013731 discloses a process for the copolymerization of alkylene oxides and carbon dioxide by means of DMC catalysts for the preparation of polyether carbonate polyols. In this process, a DMC catalyst which has been prepared according to U.S. Pat. No. 5,482,908 with tert-butanol as a ligand is employed. The highest carbonate content was 17.3% of carbonate (corresponds to 7.5% of carbon dioxide).

U.S. Pat. No. 6,762,278 describes a process for the copolymerization of alkylene oxides and carbon dioxide using suspensions of multi-metal cyanide catalysts (formal name for more than two metals. In the case of exactly two metals, DMC catalysts are referred to. For the definition see WO 03/029325, page 8, line 16). With the aid of the multi-metal cyanide catalyst of $K_3[Co(CN)_6]$, $ZnCl_2$ and $H_3[Co(CN)_6]$, prepared according to Example 3 with tert-butanol as a complexing ligand, a polyether carbonate polyol of which the carbonate content was only 13.2 wt. % (corresponds to 5.7 wt. % of carbon dioxide) was prepared.

The use of other zinc halides instead of zinc chloride for the preparation of DMC catalysts has been described by Il Kim et al. in Journal of Polymer Science 2005, page 4393 et seq. in the article "*Ring-Opening Polymerizations of Propylene Oxide by Double Metal Cyanide Catalysts Prepared with $ZnX_2$ (X=F, Cl, Br, or I)*" In the case of DMC catalysts with tert-butanol and poly(tetramethylene ether glycol), it has been found that the polymerization of propylene oxide proceeds best if the catalyst has been prepared with zinc bromide as the source of zinc. However, this article contains no indication that these catalysts can also be used in the copolymerization of alkylene oxides and carbon dioxide.

By means of DMC catalysts based on tert-butanol, it is thus indeed possible to prepare copolymers of at least one alkylene oxide and carbon dioxide in the presence or absence of H-functional starter substances. However, it was not possible to improve the incorporation of carbon dioxide into the copolymer. It would therefore be very desirable to provide a process wherein the copolymerization of alkylene oxides and carbon dioxide in the presence or absence of an H-functional starter and in the presence of a DMC catalyst renders possible a higher incorporation of carbon dioxide into the resulting polymer. The catalyst activation in the presence of carbon dioxide also should preferably require as little time as possible.

It has now been found, surprisingly, that the abovementioned object is achieved by a process for the preparation of polyether carbonate polyols from one or more alkylene oxides, carbon dioxide and optionally from one or more H-functional starter substances in the presence of at least one double metal cyanide catalyst, wherein the double metal cyanide catalyst comprises an unsaturated alcohol (i.e. an alcohol comprising at least one C=C or one C≡C bond) as a complexing ligand.

A preferred embodiment of the present invention is a process for the preparation of polyether carbonate polyols from one or more H-functional starter substances, from one or more alkylene oxides and carbon dioxide in the presence of at least one DMC catalyst, characterized in that the DMC catalyst is prepared by a procedure in which an aqueous solution of a cyanide-free metal salt is reacted with the aqueous solution of a metal cyanide salt in the presence of one or more organic complexing ligands originating from the class of unsaturated alcohols, wherein the unsaturated alcohol(s) are preferably contained either in the aqueous solution of the cyanide-free metal salt, the aqueous solution of the metal cyanide salt or in both aqueous solutions.

Unsaturated alcohols in the context of this invention are, for example, those of the formula $(R^1)(R^2)(R^3)C(OH)$, wherein R' is a hydrocarbon group of 2 to 20 carbon atoms having at least one C=C and/or at least one C≡C group, and wherein preferably one of the carbon atoms of the C=C or of the C≡C group is bonded to the carbon which carries the hydroxyl group, and wherein one or more hydrogen atoms of the hydrocarbon group can be replaced by atoms other than carbon or hydrogen, and $R^2$ and $R^3$ independently of each other are hydrogen, $C_1$ to $C_{20}$-alkyl (such as, for example, methyl, ethyl, propyl, butyl, pentyl, hexyl), $C_3$ to $C_{12}$-cycloalkyl, phenyl or a hydrocarbon group of 2 to 20 carbon atoms having at least one C=C and/or at least one C≡C group, wherein preferably one of the carbon atoms of the C=C or of the C≡C group is bonded to the carbon which carries the hydroxyl group, wherein in each case one or more hydrogen atoms of the hydrocarbon group can be replaced by atoms other than carbon or hydrogen.

Preferred unsaturated alcohols are 3-buten-1-ol, 3-butyn-1-ol, 2-propen-1-ol, 2-propyn-1-ol, 2-methyl-3-buten-2-ol, 2-methyl-3-butyn-2-ol, 3-buten-1-ol, 3-butyn-1-ol, 3-methyl-1-penten-3-ol and 3-methyl-1-pentyn-3-ol. It is also possible here for one or more of the hydrogen atoms in the unsaturated alcohols to be replaced by halogen atoms (F, Cl, Br, I). Particularly preferred unsaturated alcohols are 2-methyl-3-buten-2-ol, 2-methyl-3-butyn-2-ol and 3-methyl-1-pentyn-3-ol. 3-Methyl-1-pentyn-3-ol is most preferred.

The process according to the invention for the preparation of polyether carbonate polyols can be carried out continuously, semi-batchwise or discontinuously.

The polyether carbonate polyols obtained according to the invention in general have a functionality of at least 1, preferably of from 2 to 8, particularly preferably from 2 to 6 and very particularly preferably from 2 to 4. The molecular weight is preferably 400 to 10,000 g/mol and particularly preferably 500 to 6,000 g/mol.

Generally, alkylene oxides having 2-24 carbon atoms can be employed for the process according to the invention. The alkylene oxides having 2-24 carbon atoms are, for example, one or more compounds chosen from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, such as, for example, methyl glycidyl ether, ethyl glycidyl ether, 2-ethylhexyl glycidyl ether, allyl glycidyl ether, glycidyl methacrylate and epoxide-functional alkyloxysilanes, such as, for example, 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Preferably, ethylene oxide and/or propylene oxide, in particular propylene oxide, are employed as alkylene oxides. It is also possible for two or more alkylene oxides together to be reacted with carbon dioxide.

Compounds having H atoms which are active for the alkoxylation can be employed as a suitable H-functional starter substance. Groups which have active H atoms and are active for the alkoxylation are, for example, —OH, —$NH_2$ (primary amines), —NH— (secondary amines), —SH, and —$CO_2H$, and —OH and —$NH_2$ are preferred, and —OH is particularly preferred. The H-functional starter substance employed is, for example, one or more compounds chosen from the group consisting of mono- or polyfunctional alcohols, mono- or polyfunctional amines, polyfunctional thiols, carboxylic acids, amino alcohols, aminocarboxylic acids, thioalcohols, hydroxy esters, polyether polyols, polyester polyols, polyester ether polyols, polyether carbonate polyols, polycarbonate polyols, polyethyleneimines, polyetheramines (e.g. so-called Jeffamines® from Huntsman, such as e.g. D-230, D-400, D-2000, T-403, T-3000, T-5000 or corresponding products of BASF, such as e.g. Polyetheramine D230, D400, D200, T403, T5000), polytetrahydrofurans (e.g. PolyTHF® from BASF, such as e.g. PolyTHF® 250, 650S, 1000, 10005, 1400, 1800, 2000), polytetrahydrofuranamines (BASF product Polytetrahydrofuranamine 1700), polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$-alkyl fatty acid esters which comprise on average at least 2 OH groups per molecule. By way of example, the $C_1$-$C_{24}$-alkyl fatty acid esters which comprise on average at least 2 OH groups per molecule are commercial products such as Lupranol Balance® (BASF SE), Merginol® types (Hobum Oleochemicals GmbH), Sovermol® types (Cognis Deutschland GmbH & Co. KG) and Soyol®TM types (USSC Co.).

Monofunctional starter substances which can be employed are alcohols, amines, thiols and carboxylic acids. Monofunctional alcohols which can be used are: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Possible monofunctional amines are: butylamine, tert-butylamine, pentylamine, hexylamine, aniline, aziridine, pyrrolidine, piperidine, morpholine. Monofunctional thiols which can be used are: ethanethiol, 1-propanethiol, 2-propanethiol, 1-butanethiol, 3-methyl-1-butanethiol, 2-butene-1-thiol, thiophenol. Monofunctional carboxylic acids which may be mentioned are: formic acid, acetic acid, propionic acid, butyric acid, fatty acids, such as stearic acid, palmitic acid, oleic acid, linoleic acid, linolenic acid, benzoic acid, acrylic acid.

Polyfunctional alcohols which are suitable as H-functional starter substances are, for example, difunctional alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol, 1,8-octanediol, 1,10-decanediol, 1,12-dodecanediol, bis-(hydroxymethyl)-cyclohexanes (such as, for example, 1,4-bis-(hydroxymethyl) cyclohexane), triethylene glycol, tetraethylene glycol, polyethylene glycols, dipropylene glycol, tripropylene glycol, polypropylene glycols, dibutylene glycol and polybutylene glycols); trifunctional alcohols (such as, for example, trimethylolpropane, glycerol, trishydroxyethyl isocyanurate, castor oil); tetrafunctional alcohols (such as, for example, pentaerythritol); polyalcohols (such as, for example, sorbitol, hexitol, sucrose, starch, starch hydrolysates, cellulose, cellulose hydrolysates, hydroxy-functionalized fats and oils, in particular castor oil), and all modification products of these abovementioned alcohols with various amounts of ε-caprolactone.

The H-functional starter substances can also be chosen from the substance class of polyether polyols, in particular those having a molecular weight Mn in the range of from 100 to 4,000 g/mol. Polyether polyols which are built up from recurring ethylene oxide and propylene oxide units are preferred, preferably having a content of from 35 to 100% of propylene oxide units, particularly preferably having a content of from 50 to 100% of propylene oxide units. These can be random copolymers, gradient copolymers or alternating or block copolymers of ethylene oxide and propylene oxide. Suitable polyether polyols built up from recurring propylene oxide and/or ethylene oxide units are, for example, the Desmophen®, Acclaim®, Arcol®, Baycoll®, Bayfill®, Bayflex®, Baygal®, PET® and polyether polyols of Bayer MaterialScience AG (such as e.g. Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homo-polyethylene oxides are, for example, the Pluriol® E brands from BASF SE, suitable homo-polypropylene oxides are, for example, the Pluriol® P brands from BASF SE, and suitable mixed copolymers of ethylene oxide and propylene oxide are, for example, the Pluronic® PE or Pluriol® RPE brands from BASF SE.

The H-functional starter substances can also be chosen from the substance class of polyester polyols, in particular those having a molecular weight Mn in the range of from 200 to 4,500 g/mol. At least difunctional polyesters are employed as polyester polyols. Polyester polyols preferably consist of alternating acid and alcohol units. Acid components which are employed are e.g. succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixture of the acids and/or anhydrides mentioned. Alcohol components which are used are e.g. ethanediol, 1,2-propanediol, 1,3-propanediol, 1,4-butanediol, 1,5-pentanediol, neopentyl glycol, 1,6-hexanediol, 1,4-bis-(hydroxymethyl)-cyclohexane, diethylene glycol, dipropylene glycol trimethylolpropane, glycerol, pentaerythritol or mixtures of the alcohols mentioned. If difunctional or polyfunctional polyether polyols are employed as the alcohol component, polyester ether polyols, which can likewise serve as starter substances for the preparation of the polyether carbonate polyols, are obtained. Preferably, polyether polyols having Mn=150 to 2,000 g/mol are employed for the preparation of the polyester-ether polyols.

Polycarbonate diols can furthermore be employed as H-functional starter substances, in particular those having a molecular weight Mn in the range of from 150 to 4,500 g/mol, preferably 500 to 2,500, which are prepared, for example, by reaction of phosgene, dimethyl carbonate, diethyl carbonate or diphenyl carbonate and difunctional alcohols or polyester polyols or polyether polyols. Examples of polycarbonates are to be found e.g. in EP-A 1359177. For example, the Desmophen® C types from Bayer MaterialScience AG, such as e.g. Desmophen® C 1100 or Desmophen® C 2200, can be used as polycarbonate diols.

In a further embodiment of the invention, polyether carbonate polyols can be employed as H-functional starter substances. In particular, polyether carbonate polyols which are obtainable by the process according to the invention described here are employed. These polyether carbonate polyols employed as H-functional starter substances are prepared beforehand for this in a separate reaction step.

The H-functional starter substances in general have a functionality (i.e. number of H atoms per molecule which are active for the polymerization) of from 1 to 8, preferably of 2 or 3. The H-functional starter substances are employed either individually or as a mixture of at least two H-functional starter substances.

Preferred H-functional starter substances are alcohols of the general formula (II)

$$HO-(CH_2)_x-OH \qquad (II)$$

wherein x is a number from 1 to 20, preferably an even number from 2 to 20. Examples of alcohols according to formula (II) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols according to formula (II) with ε-caprolactone, e.g. reaction products of trimethylolpropane with ε-caprolactone, reaction products of glycerol with ε-caprolactone and reaction products of pentaerythritol with ε-caprolactone. H-functional starter substances which are furthermore preferably employed are water, diethylene glycol, dipropylene glycol, castor oil, sorbitol and polyether polyols built up from recurring polyalkylene oxide units.

The H-functional starter substances are particularly preferably one or more compounds chosen from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, di- and trifunctional polyether polyols, wherein the polyether polyol is built up from a di- or tri-H-functional starter substance and propylene oxide or a di- or tri-H-functional starter substance, propylene oxide and ethylene oxide. The polyether polyols preferably have a molecular weight Mn in the range of from 62 to 4,500 g/mol and a functionality of from 2 to 3, and in particular a molecular weight Mn in the range of from 62 to 3,000 g/mol and a functionality of from 2 to 3.

The preparation of the polyether carbonate polyols is carried out by catalytic addition of carbon dioxide and alkylene oxides on to H-functional starter substances. In the context of the invention, "H-functional" is understood as meaning the number of H atoms per molecule of the starter substance which are active for the alkoxylation.

The DMC catalysts employed for the process according to the invention are preferably obtained by a procedure in which
(i) in the first step an aqueous solution of a cyanide-free metal salt is reacted with the aqueous solution of a metal cyanide salt in the presence of one or more unsaturated alcohols, wherein the unsaturated alcohols are contained either in the aqueous solution of the cyanide-free metal salt, the aqueous solution of the metal cyanide salt or in both aqueous solution,
(ii) wherein in the second step the solid is separated off from the suspension obtained from (i),
(iii) wherein, if appropriate, in a third step the solid which has been isolated is washed with an aqueous solution of an unsaturated alcohol (e.g. by resuspending and subsequent renewed isolation by filtration or centrifugation),
(iv) wherein the solid obtained is then dried, optionally after pulverization,
and wherein in the first step or immediately after the precipitation of the double metal cyanide compound (second step), one or more unsaturated alcohols, preferably in excess (based on the double metal cyanide compound), and optionally further complexing components are added.

For example, for the preparation of the DMC catalysts, an aqueous solution of zinc chloride (preferably in excess, based on the metal cyanide salt) and potassium hexacyanocobaltate (as the metal cyanide salt) is mixed and the unsaturated alcohol (preferably in excess, based on zinc hexacyanocobaltate) and optionally further complexing components are then added to the suspension formed.

Cyanide-free metal salts which are suitable for the preparation of the double metal cyanide compounds preferably have the general formula (III)

$$M(X)_n \qquad (III)$$

wherein
M is chosen from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, preferably M is $Zn^{2+}$, $Fe^{2+}$, $Co^{2+}$ or $Ni^{2+}$,
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, alcoholate, oxalate and nitrate;
n is 1 if X=sulfate, carbonate or oxalate and
n is 2 if X=halide, hydroxide, cyanate, thiocyanate, isocyanate, isothiocyanate or nitrate,
or suitable cyanide-free metal salts have the general formula (IV)

$$M_r(X)_3 \qquad (IV)$$

wherein
M is chosen from the metal cations $Fe^{3+}$, $Al^{3+}$ and $Cr^{3+}$,
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
r is 2 if X=sulfate, carbonate or oxalate and
r is 1 if X=halide, hydroxide, cyanate, thiocyanate, isocyanate, isothiocyanate, carboxylate or nitrate,
or suitable cyanide-free metal salts have the general formula (V)

$$M(X)_s \qquad (V)$$

wherein
M is chosen from the metal cations $Mo^{4+}$, $V^{4+}$ and $W^{4+}$
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
s is 2 if X=sulfate, carbonate or oxalate and
s is 4 if X=halide, hydroxide, cyanate, thiocyanate, isocyanate, isothiocyanate, carboxylate or nitrate,
or suitable cyanide-free metal salts have the general formula (VI)

$$M(X)_t \qquad (VI)$$

wherein
M is chosen from the metal cations $Mo^{6+}$ and $W^{6+}$
X are one or more (i.e. different) anions, preferably an anion chosen from the group of halides (i.e. fluoride, chloride, bromide, iodide), hydroxide, sulfate, carbonate, cyanate, thiocyanate, isocyanate, isothiocyanate, carboxylate, oxalate and nitrate;
t is 3 if X=sulfate, carbonate or oxalate and
t is 6 if X=halide, hydroxide, cyanate, thiocyanate, isocyanate, isothiocyanate, carboxylate or nitrate.

Examples of suitable cyanide-free metal salts are zinc fluoride, zinc chloride, zinc bromide, zinc iodide, zinc acetate, zinc acetylacetonate, zinc hexafluoroacetylacetonate, zinc 2-ethylhexanoate, zinc benzoate, zinc nitrate, iron(II) sulfate, iron(II) bromide, iron(II) chloride, cobalt(II) chloride, cobalt (II) thiocyanate, nickel(II) chloride and nickel(II) nitrate. Zinc chloride, zinc bromide and zinc iodide are particularly preferred and zinc chloride and zinc bromide are most preferred. Mixtures of various cyanide-free metal salts can also be employed.

Metal cyanide salts which are suitable for the preparation of the double metal cyanide compounds preferably have the general formula (VII)

$$(Y)_a M'(CN)_b (A)_c \qquad (VII)$$

wherein

M' is chosen from one or more metal cations of the group consisting of Fe(II), Fe(III), Co(II), Co(III), Cr(II), Cr(III), Mn(II), Mn(III), Ir(III), Ni(II), Rh(III), Ru(II), V(IV) and V(V), preferably M' is one or more metal cations of the group consisting of Co(II), Co(III), Fe(II), Fe(III), Cr(III), Ir(III) and Ni(II), Y is chosen from one or more metal cations of the group consisting of alkali metal (i.e. $Li^+$, $Na^+$, $K^+$, $Rb^+$, $Cs^+$) and alkaline earth metal (i.e. $Be^{2+}$, $Ca^{2+}$, $Mg^{2+}$, $Sr^{2+}$, $Ba^{2+}$), A is chosen from one or more anions of the group consisting of halides (i.e. fluoride, chloride, bromide, iodide), hydroxide, sulfate, carbonate, cyanate, thiocyanate, isocyanate, isothiocyanate, carboxylate, oxalate or nitrate and a, b and c are integers, wherein the values for a, b and c are chosen such that the metal cyanide salt has electroneutrality; a is preferably 1, 2, 3 or 4; b is preferably 4, 5 or 6; c preferably has the value 0.

Examples of suitable metal cyanide salts are potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds which the DMC catalysts according to the invention comprise are compounds of the general formula (VIII)

$$M_x[M'_{x'}(CN)_y]_z \qquad (VIII),$$

wherein M is as defined in formula (III) to (VI) and
M' is as defined in formula (VII), and
x, x', y and z are integers and are chosen such that the double metal cyanide compound has electroneutrality.

Preferably
x=3, x'=1, y=6 and z=2,
M=Zn(II), Fe(II), Co(II) or Ni(II) and
M'=Co(III), Fe(III), Cr(III) or Ir(III).

Examples of suitable double metal halide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds are to be found e.g. in U.S. Pat. No. 5,158,922 (column 8, lines 29-66). Zinc hexacyanocobaltate(III) is particularly preferably used.

It s also possible for the double metal cyanide catalyst to comprise one or more further complexing ligands in addition to the unsaturated alcohol. For this, one ore more further complexing component(s) from the compound classes of polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose and polyacetals, or of glycidyl ethers, glycosides, carboxylic acid esters of polyfunctional alcohols, bile acids or salts, esters or amides thereof, cyclodextrins, phosphorus compounds, α,β-unsaturated carboxylic acid esters or ionic surface- or interface-active compounds are employed in the preparation of the DMC catalysts.

Preferably, in the first step in the preparation of the DMC catalysts employed for the process according to the invention, the aqueous solutions of the metal salt (e.g. zinc chloride), employed in a stoichiometric excess (at least 50 mol %, based on the metal cyanide salt, that is to say at least a molar ratio of cyanide-free metal salt to metal cyanide salt of 2.25 to 1.00) and of the metal cyanide salt (e.g. potassium hexacyanocobaltate) are reacted in the presence of the unsaturated alcohols, wherein the unsaturated alcohol(s) is/are contained either in the aqueous solution of the cyanide-free metal salt, the aqueous solution of the metal cyanide salt or in both aqueous solutions, so that a suspension which contains the double metal cyanide compound (e.g. zinc hexacyanocobaltate), water, excess cyanide-free metal salt and the unsaturated alcohol is formed. In this context, the further complexing component (e.g. a polyether) can be present in the aqueous solution of the cyanide-free metal salt and/or of the metal cyanide salt, or it is added directly to the suspension obtained after precipitation of the double metal cyanide compound. It has proved advantageous for the aqueous solutions of the cyanide-free metal salt and of the metal cyanide salt, wherein one or more unsaturated alcohols are contained either in the aqueous solution of the cyanide-free metal salt, the aqueous solution of the metal cyanide salt or in both aqueous solutions, and the further complexing component to be mixed with vigorous stirring. The suspension formed in the first step is then optionally treated with at least one of the above-mentioned complexing ligands (e.g. unsaturated alcohol or polyether). In this context, the unsaturated alcohol is preferably employed in a mixture with water and a further complexing component (e.g. polyether). A preferred process for carrying out the first step (i.e. the preparation of the suspension) is carried out employing a mixing nozzle, particularly preferably employing a jet disperser as described in WO-A 01/39883.

The separating off according to step (ii) is carried out by techniques known to the person skilled in the art, such as, for example, centrifugation or filtration.

In a preferred embodiment variant, in a third process step (iii) the solid which has been isolated is subsequently washed with an aqueous solution of the unsaturated alcohol (e.g. by resuspending and subsequent renewed isolation by filtration or centrifugation). In this manner, for example, water-soluble by-products, such as potassium chloride, can be removed from the catalyst according to the invention. Preferably, the amount of unsaturated alcohol in the aqueous washing solution is between 40 and 80 wt. %, based on the total solution.

In the third step, one or more further complexing components is optionally added to the aqueous washing solution, preferably in the range of between 0.5 and 5 wt. %, based on the total amount of the washing solution of step (iii).

It is moreover advantageous for the solid which has been isolated to be washed more than once. Preferably, washing is carried out in a first washing step (iii-1) with an aqueous solution of the unsaturated alcohol (e.g. by resuspending and subsequent renewed isolation by filtration or centrifugation), in order to remove, for example, water-soluble by-products, such as potassium chloride, from the catalyst according to the invention in this manner. Particularly preferably, the amount of unsaturated alcohol in the aqueous washing solution is between 40 and 80 wt. %, based on the total solution of the first washing step. In the further washing steps (iii-2), either the first washing step is repeated once or several times, preferably once to three times, or, preferably, a non-aqueous solution, such as e.g. a mixture or solution of unsaturated alcohol and further complexing component (preferably in the range between 0.5 and 5 wt. %, based on the total amount of the washing solution of step (iii-2)), is employed as the washing solution and the solid is washed with this once or several times, preferably once to three times.

The drying according to step (iv) is preferably carried out at temperatures of 20-100° C. and preferably under a pressure (absolute) of from 0.1 mbar to 1,013 mbar. Preferably, the solid is pulverized before the drying.

A preferred method for isolating the DMC catalysts according to the invention from the suspension by filtration, washing of the filter cake and drying is described in WO-A 01/80994.

The invention also provides a process for the preparation of polyether carbonate polyols from one or more alkylene oxides, carbon dioxide and one or more H-functional starter substances in the presence of at least one double metal cyanide catalyst which comprises an unsaturated alcohol as a complexing ligand, characterized in that ($\alpha$) the H-functional starter substance or a mixture of at least two H-functional starter substances is optionally initially introduced into the reaction vessel and, where appropriate, water and/or other readily volatile compounds are removed by elevated temperature and/or reduced pressure ("drying"), the DMC catalyst being added to the H-functional starter substance or the mixture of at least two H-functional starter substances before or after the drying, ($\beta$) for the activation ($\beta$1) in a first activation step a first part amount (based on the total amount of the amount of alkylene oxides employed in the activation and copolymerization) of one or more alkylene oxides is added to the mixture resulting from step ($\alpha$), it being possible for this addition of the part amount of alkylene oxide optionally to be carried out in the presence of $CO_2$, but preferably in the absence of $CO_2$, and the temperature peak ("hot spot") which occurs due to the subsequent exothermic chemical reaction and/or a drop in pressure in the reactor then in each case being awaited, ($\beta$2) in a second activation step after the temperature peak reached in the preceding activation step, a second part amount (based on the total amount of the amount of alkylene oxides employed in the activation and copolymerization) of one or more alkylene oxides is added to the mixture resulting from the preceding activation step, it being possible for this addition of the part amount of alkylene oxide optionally to be carried out in the presence of $CO_2$, but preferably in the absence of $CO_2$, and the temperature peak ("hot spot") which occurs due to the subsequent exothermic chemical reaction and/or a drop in pressure in the reactor then in each case being awaited.

($\beta$3) optionally, in a third activation step or further activation steps, after the temperature peak reached in the preceding activation step, step ($\beta$2) is repeated zero to five times, preferably once to four times, particularly preferably exactly once, this addition of the part amount or these additions of the part amounts of alkylene oxide being carried out in the absence of $CO_2$, and the temperature peak ("hot spot") which occurs due to the subsequent exothermic chemical reaction and/or a drop in pressure in the reactor then in each case being awaited, ($\beta$4) optionally, in a further activation step or further activation steps, after the temperature peak reached in the preceding activation step, step ($\beta$3) is repeated once to five times, preferably once to four times, particularly preferably exactly once, this addition of the part amount or these additions of the part amounts of alkylene oxide being carried out in the presence of $CO_2$, and the temperature peak ("hot spot") which occurs due to the subsequent exothermic chemical reaction and/or a drop in pressure in the reactor then in each case being awaited, ($\gamma$) one or more alkylene oxides and carbon dioxide are added to the mixture resulting from step ($\beta$) ("copolymerization"). The alkylene oxides employed for the copolymerization can be identical to or different from the alkylene oxides employed in the activation.

In a preferred embodiment, the particular part amount of one or more alkylene oxides which is employed in the activation in steps $\beta$1 to $\beta$4 is 2.0 to 15.0 wt. %, preferably 2.5 to 14.0 wt. %, particularly preferably 3.0 to 13.0 wt. % (based on the total amount of the amount of alkylene oxides employed in the activation and copolymerization).

Step ($\alpha$):

For the preparation of polyether carbonate polyols by catalytic addition of alkylene oxides (epoxides) and carbon dioxide on to H-functional starter substances (starters) in the presence of the DMC catalysts according to the invention, the H-functional starter substance or a mixture of at least two H-functional starter substances is initially introduced into the reaction vessel and, where appropriate, water and/or other readily volatile compounds are removed. This is carried out, for example, by stripping by means of nitrogen (optionally under reduced pressure) or by distillation in vacuo at temperatures of from 50 to 200° C., preferably 80 to 160° C., particularly preferably at 100 to 140° C. This pretreatment of the starter substance or mixture of starter substances is called drying in the following for simplification.

In this context, the DMC catalyst can be already initially introduced into the reaction vessel in the H-functional starter substance or the mixture of at least two H-functional starter substance, but it is also possible for the DMC catalyst, which has then been dried, to be added to the H-functional starter substance or the mixture of H-functional starter substances only after the drying. The DMC catalyst can be added in the solid form or as a suspension in an H-functional starter substance. If the catalyst is added as a suspension, this is preferably added before drying of the H-functional starter substance(s).

Step ($\beta$):

The metering of one or more alkylene oxides and optionally of the carbon dioxide is carried out after the drying of a starter substance or the mixture of several starter substances and the addition of the DMC catalyst, which is added as a solid or in the form of a suspension, before or after the drying of the starter substance. If the DMC catalyst is added after the drying of the starter substance, this DMC catalyst should preferably be dried, for example in a process analogous to the drying of the starter substance. The metering of one or more alkylene oxides and of the carbon dioxide can in principle be carried out in various ways. The start of the metering can take place from a vacuum or under a previously selected prepressure. The prepressure is preferably established by passing in an inert gas, such as, for example, nitrogen, the pressure (absolute) being established at between 10 mbar to 10 bar, preferably 100 mbar to 8 bar and preferably 500 mbar to 6 bar. In a particularly preferred embodiment, the mixture of one or more starter substances and the DMC catalyst resulting from step ($\alpha$) is charged, at a temperature of from 100° C. to 130° C., at least once, preferably three times with 1.5 bar to 10 bar (absolute), particularly preferably 3 bar to 6 bar (absolute), of an inert gas (nitrogen or a noble gas, such as, for example, argon) and each time immediately subsequently to within 15 min the increased pressure is reduced to 1 bar (absolute). Alternatively, in a similarly particularly preferred embodiment, an inert gas (nitrogen or a noble gas, such as, for example, argon) is passed into the mixture, which results from step (α), of one or more starter substances and the DMC catalyst at a temperature of from 40° C. to 130° C., and at the same time a reduced pressure (absolute) of from 10 mbar to 800 mbar, particularly preferably from 50 mbar to 200 mbar, is applied.

Step (γ):

The metering of one or more alkylene oxides and of the carbon dioxide can be carried out simultaneously or sequentially, it being possible for the total amount of carbon dioxide to be added all at once or by metering over the reaction time. Preferably, the carbon dioxide is metered. The metering of one or more alkylene oxides is carried out simultaneously with or sequentially to the carbon dioxide metering. If several alkylene oxides are employed for synthesis of the polyether carbonate polyols, metering thereof can be carried out simultaneously or sequentially via in each case separate metering operations, or via one or more metering operations, at least two alkylene oxides being metered as a mixture. Via the nature of the metering of the alkylene oxides and of the carbon dioxide, it is possible to synthesize random, alternating, block-like or gradient-like polyether carbonate polyols.

Preferably, an excess of carbon dioxide, based on the calculated amount of carbon dioxide incorporated in the polyether carbonate polyol, is employed, since due to the slowness of carbon dioxide to react an excess of carbon dioxide is advantageous. The amount of carbon dioxide can be determined via the overall pressure under the particular reaction conditions. The range of from 0.01 to 120 bar, preferably 0.1 to 110 bar, particularly preferably from 1 to 100 bar has proved to be advantageous as the overall pressure (absolute) for the copolymerization for the preparation of the polyether carbonate polyols. It has furthermore been found for the process according to the invention that the copolymerization for the preparation of the polyether carbonate polyols is advantageously carried out at 50 to 150° C., preferably at 60 to 145° C., particularly preferably at 70 to 140° C. and very particularly preferably at 110 to 120° C. If temperatures below 50° C. are established, the reaction ceases. At temperatures above 150° C. the amount of undesirable by-products increases greatly. It is furthermore to be ensured that under the choice of pressure and temperature $CO_2$ passes from the gaseous state as far as possible into the liquid and/or supercritical liquid state. However, $CO_2$ can also be added to the reactor as a solid and can then pass into the liquid and/or supercritical liquid state under the reaction conditions chosen.

Particularly preferred reactors are: tube reactor, stirred tank, loop reactor. Polyether polycarbonate polyols can be prepared in a stirred tank, the stirred tank being cooled via the reactor jacket, internal cooling surfaces and/or cooling surfaces in a pumped circulation, depending on the embodiment and mode of operation. For safety reasons, the content of free epoxide in the reaction mixture of the stirred tank should not exceed 15 wt. % (see, for example, WO-A 2004/081082; page 3; line 14). Both in the semi-batch use, where the product is removed only after the end of the reaction, and in the continuous use, where the product is removed continuously, attention is therefore to be paid in particular to the metering rate of the epoxide. It is to be adjusted such that in spite of the inhibiting action of the carbon dioxide, the epoxide reacts sufficiently rapidly. It is possible to feed in the carbon dioxide continuously or discontinuously. This depends on whether the epoxide is consumed rapidly enough and whether the product is optionally to contain $CO_2$-free polyether blocks. The amount of carbon dioxide (stated as the pressure) can equally be varied during the addition of the epoxide. It is possible gradually to increase or to lower or to leave constant the $CO_2$ pressure during the addition of the epoxide.

A further possible embodiment in the stirred tank for the copolymerization (step γ) is characterized in that one or more H-functional starter compounds are metered continuously into the reactor during the reaction. The amount of H-functional starter compounds which are metered continuously into the reactor during the reaction is preferably at least 20 equivalent mol %, particularly preferably 70 to 95 equivalent mol % (in each case based on the total amount of H-functional starter compounds).

The mixture of catalyst activated by this process/starter can be (further) copolymerized with epoxide and carbon dioxide in the stirred tank, but also in another reaction container (tube reactor or loop reactor).

In the case of a tube reactor, the DMC catalyst, which has optionally been activated beforehand, and H-functional starter compound as well as the epoxide and carbon dioxide are pumped continuously through a tube. The molar ratios of the reaction partners vary according to the desired polymer. In a preferred embodiment, carbon dioxide is metered in here in its supercritical form, that is to say virtually liquid form, in order to render possible a better miscibility of the components. For better thorough mixing of the reaction partners, mixing elements such as are marketed, for example, by Ehrfeld Mikrotechnik BTS GmbH, or mixer-heat exchanger elements which simultaneously improve the mixing and removal of heat are advantageously installed.

Even loop reactors can be used for the preparation of polyether polycarbonate polyols. These include in general reactors with recycling of substances, such as, for example, a jet loop reactor, which can also be operated continuously, or a loop of tube reactors. The use of a loop reactor is of advantage in particular because back-mixing can be realized here, so that the epoxide concentration should be low. In order to realize complete conversion, a tube ("dwell tube") is often installed downstream.

The polyether carbonate polyols obtainable by the process according to the invention have a low content of by-products and can be processed without problems, in particular by reaction with di- and/or polyisocyanates to give polyurethanes, in particular flexible polyurethane foams. For polyurethane uses, polyether carbonate polyols which are based on an H-functional starter substance which has a functionality of at least 2 are preferably employed. The polyether carbonate polyols obtainable by the process according to the invention can furthermore be used in uses such as detergent and cleaning agent formulations, drilling liquids, fuel additives, ionic and nonionic surfactants, lubricants, process chemicals for papermaking or textile production or cosmetic formulations. It is known to the person skilled in the art that, depending on the particular field of use, the polyether carbonate polyols to be used must comply with certain substance properties, such as, for example, molecular weight, viscosity, polydispersity, functionality and/or hydroxyl number.

EXAMPLES

The weight- and number-average molecular weight of the polymers formed was determined by means of gel permeation chromatography (GPC). The procedure was in accordance with DIN 55672-1: "Gel permeation chromatography, Part 1—Tetrahydrofuran as the eluting agent". Polystyrene samples of known molecular weight were used here for the calibration.

The OH number (hydroxyl number) was determined in accordance with DIN 53240-2, pyridine being used as the solvent, however, instead of THF/methylene chloride. Titration was carried out with 0.5 molar ethanolic KOH (end point detection by means of potentiometry). Castor oil with an OH number specified by certificate functioned as the test substance. The unit stated in "mg/g" relates to mg[KOH]/g[polyether carbonate polyol].

The content of $CO_2$ incorporated in the resulting polyether carbonate polyol and the ratio of propylene carbonate to polyether carbonate polyol were determined by means of $^1$H-NMR (Bruker, DPX 400, 400 MHz; pulse program zg30, waiting time d1: 10 s, 64 scans). The sample was dissolved in deuterated chloroform in each case. The relevant resonances in the $^1$H-NMR (based on TMS=0 ppm) are as follows:
cyclic carbonate (which was formed as a by-product) resonance at 4.5 ppm, carbonate, resulting from carbon dioxide incorporated in the polyether carbonate polyol (resonances at 5.1 to 4.8 ppm), unreacted PO with resonance at 2.4 ppm, polyether polyol (i.e. without incorporated carbon dioxide) with resonances at 1.2 to 1.0 ppm, the 1,8-octanediol, incorporated as the H-functional starter compound, with a resonance at 1.6 to 1.52 ppm.

The molar content of the carbonate incorporated in the polymer in the reaction mixture is calculated according to formula (IX) as follows, the following abbreviations being used:
A(4.5)=area of the resonance at 4.5 ppm for cyclic carbonate (corresponds to an H atom)
A(5.1-4.8)=area of the resonance at 5.1-4.8 ppm for polyether carbonate polyol and an H atom for cyclic carbonate.
A(2.4)=area of the resonance at 2.4 ppm for free, unreacted PO
A(1.2-1.0)=area of the resonance at 1.2-1.0 ppm for polyether polyol
A(1.6-1.52)=area of the resonance at 1.6 to 1.52 ppm for 1,8-octanediol (H-functional starter compound)

Taking into account the relative intensities, the polymer-bonded carbonate ("linear carbonate" LC) in the reaction mixture was converted into mol % according to the following formula (IX):

$$LC = \frac{A(5.1-4.8) - A(4.5)}{A(5.1-4.8) + A(2.4) + 0.33 * A(1.2-1.0) + 0.25 * A(1.6-1.52)} * 100 \quad (IX)$$

The weight content (in wt. %) of polymer-bonded carbonate (LC') in the reaction mixture was calculated according to formula (X)

$$LC' = \frac{[A(5.1-4.8) - A(4.5)] * 102}{N} * 100\% \quad (X)$$

the value for N ("denominator" N) being calculated according to formula (XI):

$$N = [A(5.1-4.8) - A(4.5)] * 102 + A(4.5) * 102 + A(2.4) * 58 + 0.33 * A(1.2-1.0) * 58 + 0.25 * A(1.6-1.52) * 146 \quad (XI)$$

The factor 102 results from the sum of the molecular weights of $CO_2$ (molecular weight 44 g/mol) and that of propylene oxide (molecular weight 58 g/mol), the factor 58 results from the molecular weight of propylene oxide and the factor 146 results from the molecular weight of the H-functional starter employed, 1,8-octanediol.

The weight content (in wt. %) of cyclic carbonate (CC') in the reaction mixture was calculated according to formula (XII), $$CC' = \frac{A(4.5) * 102}{N} * 100\% \quad (XII)$$

the value for N being calculated according to formula (XI).

In order to calculate from the values of the composition of the reaction mixture the composition based on the polymer content (consisting of polyether polyol, which was built up from the starter and propylene oxide during the activation steps which took place under $CO_2$-free conditions, and polyether carbonate polyol, built up from the starter, propylene oxide and carbon dioxide during the activation steps which took place in the presence of $CO_2$ and during the copolymerization), the non-polymer constituents of the reaction mixture (i.e. cyclic propylene carbonate and any unreacted propylene oxide present) were eliminated by calculation. The weight content of the carbonate recurring units in the polyether carbonate polyol was converted into a weight content of carbon dioxide by means of the factor F=44/(44+58). The $CO_2$ content in the polyether carbonate polyol stated ("$CO_2$ incorporated"; see the following examples and Table 1) is standardized to the content of the polyether carbonate polyol molecule which was formed during the copolymerization and, where appropriate, the activation steps in the presence of $CO_2$ (i.e. the content of the polyether carbonate polyol molecule which results from the starter (1,8-octanediol) and from the reaction of the starter with epoxide which was added under $CO_2$-free conditions was not taken into account here).

Examples 1 to 6

The catalysts were prepared as follows:

Example 1 (Comparison)

Preparation of a Catalyst Which is Not According to the Invention and is based on tert-butanol The catalyst was prepared with an apparatus according to FIG. 4 from WO-A 01/39883.

A solution of 258 g of zinc chloride in 937 g of distilled water and 135 g of tert-butanol was circulated at 50° C. in a loop reactor comprising a jet disperser according to FIG. 2 from WO-A 01/39883 having a bore (diameter 0.7 mm). A solution of 26 g of potassium hexacyanocobaltate (0.078 mol) in 332 g of distilled water was metered into this mixture. The pressure loss in the jet disperser during the metering and the subsequent circulation period was 2.5 bar. The dispersion formed was then circulated for 60 min at 50° C. under a pressure loss in the jet disperser of 2.5 bar. Thereafter, a mixture of 5.7 g of tert-butanol, 159 g of distilled water and 27.6 g of polypropylene glycol 1000 was metered in and the dispersion was then circulated for 80 min at 50° C. under a pressure loss in the jet disperser of 2.5 bar.

230 g of the dispersion obtained were filtered in a pressure filter of 20 cm$^3$ filter area and then washed with a mixture of 82 g of tert-butanol, 42.3 g of distilled water and 1.7 g of polypropylene glycol 1000. The washed filter cake was pressed off mechanically between two strips of filter paper and finally dried for 2 h at 60° C. under a high vacuum of approx. 0.05 bar (absolute).

Example 2

Preparation of a Catalyst According to the Invention Based on 2-methyl-3-buten-2-ol The catalyst was prepared with an apparatus according to FIG. 4 from WO-A 01/39883.

A solution of 258 g of zinc chloride in 937 g of distilled water and 135 g of 2-methyl-3-buten-2-ol was circulated at 50° C. in a loop reactor comprising a jet disperser according to FIG. 2 from WO-A 01/39883 having a bore (diameter 0.7 mm). A solution of 26 g of potassium hexacyanocobaltate (0.078 mol) in 332 g of distilled water was metered into this mixture. The pressure loss in the jet disperser during this operation was 2.5 bar. The dispersion formed was then circulated for 60 min at 50° C. under a pressure loss in the jet disperser of 2.5 bar. Thereafter, a mixture of 5.7 g of 2-methyl-3-buten-2-ol, 159 g of distilled water and 27.6 g of polypropylene glycol 1000 was metered in and the dispersion was then circulated for 80 min at 50° C. under a pressure loss in the jet disperser of 2.5 bar.

230 g of the dispersion obtained were filtered in a pressure filter of 20 cm$^3$ filter area and then washed with a mixture of 82 g of 2-methyl-3-buten-2-ol, 42.3 g of distilled water and 1.7 g of polypropylene glycol 1000. The washed filter cake was pressed off mechanically between 2 strips of filter paper and finally dried for 2 h at 60° C. under a high vacuum of approx. 0.05 bar (absolute).

Example 3

Preparation of a Catalyst According to the Invention Based on 2-methyl-3-butyn-2-ol The catalyst was prepared with an apparatus according to FIG. 4 from WO-A 01/39883.

A solution of 258 g of zinc chloride in 937 g of distilled water and 135 g of 2-methyl-3-butyn-2-ol was circulated at 50° C. in a loop reactor comprising a jet disperser according to FIG. 2 from WO-A 01/39883 having a bore (diameter 0.7 mm) A solution of 26 g of potassium hexacyanocobaltate (0.078 mol) in 332 g of distilled water was metered into this mixture. The pressure loss in the jet disperser during this operation was 2.5 bar. The dispersion formed was then circulated for 60 min at 50° C. under a pressure loss in the jet disperser of 2.5 bar. Thereafter, a mixture of 5.7 g of 2-methyl-3-butyn-2-ol, 159 g of distilled water and 27.6 g of polypropylene glycol 1000 was metered in and the dispersion was then circulated for 80 min at 50° C. under a pressure loss in the jet disperser of 2.5 bar.

230 g of the dispersion obtained were filtered in a pressure filter of 20 cm$^3$ filter area and then washed with a mixture of 82 g of 2-methyl-3-butyn-2-ol, 42.3 g of distilled water and 1.7 g of polypropylene glycol 1000. The washed filter cake was pressed off mechanically between 2 strips of filter paper and finally dried for 2 h at 60° C. under a high vacuum of approx. 0.05 bar (absolute).

Example 4

Preparation of a Catalyst According to the Invention Based on 3-methyl-1-pentyn-3-ol The catalyst was prepared with an apparatus according to FIG. 4 from WO-A 01/39883.

A solution of 258 g of zinc chloride in 937 g of distilled water and 135 g of 3-methyl-1-pentyn-3-ol was circulated at 50° C. in a loop reactor comprising a jet disperser according to FIG. 2 from WO-A 01/39883 having a bore (diameter 0.7 mm). A solution of 26 g of potassium hexacyanocobaltate (0.078 mol) in 332 g of distilled water was metered into this mixture. The pressure loss in the jet disperser during this operation was 2.5 bar. The dispersion formed was then circulated for 60 min at 50° C. under a pressure loss in the jet disperser of 2.5 bar. Thereafter, a mixture of 5.7 g of 3-methyl-1-pentyn-3-ol, 159 g of distilled water and 27.6 g of polypropylene glycol 1000 was metered in and the dispersion was then circulated for 80 min at 50° C. under a pressure loss in the jet disperser of 2.5 bar.

230 g of the dispersion obtained were filtered in a pressure filter of 20 cm$^3$ filter area and then washed with a mixture of 82 g of 3-methyl-1-pentyn-3-ol, 42.3 g of distilled water and 1.7 g of polypropylene glycol 1000. The washed filter cake was pressed off mechanically between 2 strips of filter paper and finally dried for 2 h at 60° C. under a high vacuum of approx. 0.05 bar (absolute).

Example 5

Preparation of a Catalyst According to the Invention Based on 3-methyl-1-pentyn-3-ol and Zinc Iodide A solution of 2 g (6 mmol) of potassium hexacyanocobaltate in 25 ml of distilled water was added to a solution of 46.9 g of zinc iodide in 73.5 g of distilled water and 10.5 g of 3-methyl-1-pentyn-3-ol with vigorous stirring (10,000 rpm) and the mixture was then stirred vigorously (24,000 rpm) for a further 10 min. Thereafter, a mixture of 0.4 g of 3-methyl-1-pentyn-3-ol and 2.1 g of polypropylene glycol 1000 in 12.3 g of distilled water was added to the suspension formed and the mixture was then stirred vigorously (10,000 rpm) for 3 min. The solid was isolated by a filtration over a Büchner funnel and then stirred (10,000 rpm) with a mixture of 27.3 g of 3-methyl-1-pentyn-3-ol, 14.2 g of distilled water and 0.6 g of polypropylene glycol 1000 for 10 min and filtered again. Finally, it was stirred (10,000 rpm) once more with a mixture of 39 g of 3-methyl-1-pentyn-3-ol and 0.3 g of polypropylene glycol 1000 for 10 min After filtration, the catalyst was dried for 2 h at 100° C. under a high vacuum of approx. 0.05 bar (absolute).

Example 6

Preparation of a Catalyst According to the Invention Based on 3-methyl-1-pentyn-3-ol and Zinc Bromide A solution of 2 g (6 mmol) of potassium hexacyanocobaltate in 25 ml of distilled water was added to a solution of 33.1 g of zinc bromide in 73.5 g of distilled water and 10.5 g of 3-methyl-1-pentyn-3-ol with vigorous stirring (10,000 rpm) and the mixture was then stirred vigorously (24,000 rpm) for a further 10 min. Thereafter, a mixture of 0.4 g of 3-methyl-1-pentyn-3-ol and 2.1 g of polypropylene glycol 1000 in 12.3 g of distilled water was added to the suspension formed and the mixture was then stirred vigorously (10,000 rpm) for 3 min. The solid was isolated by a filtration over a Büchner funnel and then stirred (10,000 rpm) with a mixture of 27.3 g of 3-methyl-1-pentyn-3-ol, 14.2 g of distilled water and 0.6 g of polypropylene glycol 1000 for 10 min and filtered again. Finally, it was stirred (10,000 rpm) once more with a mixture of 39 g of 3-methyl-1-pentyn-3-ol and 0.3 g of polypropylene glycol 1000 for 10 min. After filtration, the catalyst was dried for 2 h at 100° C. under a high vacuum of approx. 0.05 bar (absolute).

Examples 7 to 12

The catalysts were tested in the preparation of polyether carbonate polyols as follows:

141 mg of dried DMC catalyst according to one of Examples 1 to 6 (see following Table) and dried 51 g of 1,8-octanediol (H-functional starter compound) were initially introduced into a 1 liter pressure reactor with a gas metering device. The reactor was heated up to 130° C. and rendered inert by repeated charging with nitrogen to approx. 5 bar and subsequent letting down to approx. 1 bar. This operation was carried out 3 times. 25 g of propylene oxide (PO) were metered rapidly into the reactor at 130° C. and in the absence of $CO_2$. The activation of the catalyst manifested itself by a temperature peak ("hot spot") and by a drop in pressure to the starting pressure (approx. 1 bar). After the first drop in pressure, 20 g of PO and then 19 g of PO were metered in rapidly, as a result of which in each case a temperature peak and a drop in pressure in turn occurred. After the reactor had been charged with 50 bar of $CO_2$, 50 g of PO were metered in rapidly, as a result of which a temperature peak occurred after a waiting time [time 1]. At the same time, the pressure of carbon dioxide $CO_2$ started to fall. The pressure was regulated such that when it dropped below the set value, fresh $CO_2$ was added. Only then was the remaining propylene oxide (435 g) pumped continuously into the reactor at approx. 1.8 g/min, while after 10 minutes the temperature was lowered to 105° C. in steps of 5° C. per five minutes. When the addition of PO had ended, stirring was continued (1,500 rpm) at 105° C. under the abovementioned pressure until no further consumption of $CO_2$ was observed.

as a ligand, that the halide of the cyanide-free zinc salt has an influence on the incorporation of carbon dioxide and the time required for activation of the catalyst under carbon dioxide: At a content of $CO_2$ incorporated which is increased significantly compared with tert-butanol as a ligand, the time required for activation of the catalyst under carbon dioxide is shortened, the best result having been achieved with zinc bromide (Example 12). The highest content of $CO_2$ incorporated of 24 wt. % was achieved with 3-methyl-1-pentyn-3-ol and zinc chloride as the zinc salt (Example 10). The unsaturated alcohol ligands also advantageously reduce the waiting time up to the temperature peak during the activation under carbon dioxide (time 1).

The invention claimed is:

1. A process for the preparation of polyether carbonate polyols comprising reacting one or more alkylene oxides and carbon dioxide in the presence of at least one double metal cyanide catalyst, wherein the double metal cyanide catalyst comprises an unsaturated alcohol as a complexing ligand.

2. The process according to claim 1 comprising reacting of one or more alkylene oxides, carbon dioxide and one or more H-functional starter substances in the presence of at least one double metal cyanide catalyst, wherein the double metal cyanide catalyst comprises an unsaturated alcohol as a complexing ligand.

3. The process according to claim 1, wherein the double metal cyanide catalyst comprises an unsaturated alcohol of the formula $(R^1)(R^2)(R^3)C(OH)$, wherein $R^1$ is a hydrocarbon group of 2 to 20 carbon atoms having at least one C=C and/or at least one C≡C group and $R^2$ and $R^3$ independently of each other are hydrogen, $C_1$ to $C_{20}$-alkyl, $C_3$ to $C_{12}$-cycloalkyl, phenyl or a hydrocarbon group of 2 to 20 carbon atoms having at least one C=C and/or at least one C≡C group.

TABLE 1

Preparation of polyether carbonate polyols

| Example | Catalyst from Example | Alcohol | Zinc salt | Time 1 [min] | $CO_2$ incorporated [wt. %][1] | Cyclic/linear carbonate selectivity | OH number [mg of KOH/g] | Poly-dispersity |
| --- | --- | --- | --- | --- | --- | --- | --- | --- |
| 7 (comp.) | 1 (comp.) | tert-butanol | $ZnCl_2$ | 84 | 19.1 | 0.14 | 57.6[2] | 1.55 |
| 8 | 2 | 2-methyl-3-buten-2-ol | $ZnCl_2$ | 15 | 23.5 | 0.20 | 65.2 | 1.73 |
| 9 | 3 | 2-methyl-3-butyn-2-ol | $ZnCl_2$ | 15 | 22.1 | 0.11 | 56.9[2] | 1.67 |
| 10 | 4 | 3-methyl-1-pentyn-3-ol | $ZnCl_2$ | 24 | 28.0 | 0.28 | 82.5 | 2.03 |
| 11 | 5 | 3-methyl-1-pentyn-3-ol | $ZnI_2$ | 20 | 22.3 | 0.32 | 82.1 | 1.79 |
| 12 | 6 | 3-methyl-1-pentyn-3-ol | $ZnBr_2$ | 12 | 22.4 | 0.35 | 82.5 | 1.67 | comp. = comparative example
[1] $CO_2$ content in the part of the polymer formed in the presence of $CO_2$ (i.e. the contents of starter and polyether which forms during the activation under $CO_2$-free conditions are left out of the calculation).
[2] OH number of the reaction mixture, the propylene carbonate formed not having been separated off beforehand.

It is clear from the results of Table 1 that the replacement of tert-butanol (Comparative Example 7) by the unsaturated alcohols leads to a higher incorporation of carbon dioxide into the polymer (Examples 8 to 12). Examples 10 to 12 show, with the aid of a DMC catalyst with 3-methyl-1-pentyn-3-ol 4. The process according to claim 1, wherein the double metal cyanide catalyst comprises as the unsaturated alcohol 3-buten-1-ol, 3-butyn-1-ol, 2-propen-1-ol, 2-propyn-1-ol, 2-methyl-3-buten-2-ol, 2-methyl-3-butyn-2-ol, 3-buten-1-ol, 3-butyn-1-ol, 3-methyl-1-penten-3-ol or 3-methyl-1-pentyn- 3-ol or derivative thereof, wherein one or more of the hydrogen atoms in the unsaturated alcohols is replaced by halogen atoms.

5. The process according to claim 1, wherein the double metal cyanide catalyst comprises 2-methyl-3-buten-2-ol, 2-methyl-3-butyn-2-ol or 3-methyl-1-pentyn-3-ol as the unsaturated alcohol.

6. The process according to claim 1, wherein the double metal cyanide catalyst comprises 3-methyl-1-pentyn-3-ol as the unsaturated alcohol.

7. The process according to claim 1, wherein the double metal cyanide catalyst is prepared by a procedure comprising:
(i) in a first step, reacting an aqueous solution of a cyanide-free metal salt with an aqueous solution of a metal cyanide salt in the presence of one or more organic complexing ligands, wherein one or more unsaturated alcohols is contained either in the aqueous solution of the cyanide-free metal salt, the aqueous solution of the metal cyanide salt or in both aqueous solutions,
(ii) in a second step, separating a solid from a suspension obtained from (i),
(iii) in a third step, washing the solid isolated from (ii) with an aqueous solution of an organic complexing ligand in the absence or presence of at least one unsaturated alcohol,
(iv) drying the solid obtained from (iii),
wherein in the first step or immediately after the second step, one or more organic complexing ligands are added.

8. The process according to claim 7, wherein in the first step or immediately after the second step, one or more organic complexing ligands and one or more unsaturated alcohols are added.

9. The process according to claim 7, wherein the cyanide-free metal salt is at least one metal salt selected from the group consisting of zinc chloride, zinc bromide, zinc iodide, zinc acetate, zinc acetylacetonate, zinc benzoate, zinc nitrate, iron(II) sulfate, iron(II) bromide, iron(II) chloride, cobalt(II) chloride, cobalt(II) thiocyanate, nickel(II) chloride and nickel(II) nitrate.

10. The process according to claim 7, wherein the cyanide-free metal salt is zinc chloride, zinc bromide or a mixture of zinc chloride and zinc bromide.

11. The process according to claim 7, wherein the metal cyanide salt is at least one metal salt selected from the group consisting of potassium hexacyanocobaltate(III), potassium hexacyanoferrate(II), potassium hexacyanoferrate(III), calcium hexacyanocobaltate(III) and lithium hexacyanocobaltate(III).

12. The process according to claim 2, wherein
(a) the H-functional starter substance or a mixture of at least two H-functional starter substances is introduced into a reaction vessel and water and/or other readily volatile compounds are removed by drying, the double metal cyanide catalyst, the H-functional starter substance or the mixture of the at least two H-functional starter substances being added to the reaction vessel before or after the drying, and
(b) at least one alkylene oxide and carbon dioxide are added to the mixture resulting from step (a).

13. The process according to claim 2, wherein
(a) the H-functional starter substance or a mixture of at least two H-functional starter substances is introduced into a reaction vessel and water and/or other readily volatile compounds are removed through drying by elevated temperature and/or reduced pressure, the double metal cyanide catalyst being added to the H-functional starter substance or the mixture of at least two H-functional starter substances before or after the drying,
(b) activation of the one or more alkylene oxides proceeds by the following first and second activation steps:
(b1) in a first activation step, adding to the mixture resulting from step (a) a first part amount of the one or more alkylene oxides based on the total amount of alkylene oxides employed in the activation and copolymerization of said one or more alkylene oxides in the process of reacting said alkylene oxides, wherein the addition of said part amount of the one or more alkylene oxides is optionally carried out in the presence of $CO_2$;
(b2) in a second activation step, after a temperature peak is reached in the first activation step, which temperature peak occurs due to an exothermic chemical reaction and/or a drop in pressure in the reaction vessel, adding to the mixture resulting from the first activation step a second part amount of the one or more alkylene oxides based on the total amount of the alkylene oxides employed in the activation and copolymerization of said one or more alkylene oxides in the process of reacting said alkylene oxides, wherein the addition of said part amount of the one or more alkylene oxides is optionally carried out in the presence of $CO_2$;
(c) adding one or more alkylene oxides and carbon dioxide to the mixture resulting from step (b).

14. The process according to claim 1, wherein the double metal cyanide catalyst comprises no hexanitrometallate units $[M^2(NO_2)_6]^{3-}$, wherein $M^2$ is a trivalent transition metal ion.

* * * * *